(12) United States Patent
Jaouen (10) Patent No.: US 9,902,528 B2
(45) Date of Patent: Feb. 27, 2018

(54) MIXING POUCH WITH LIQUID AND POWDER COMPARTMENTS

(71) Applicant: Jean Jacques Jaouen, Gloucester, VA (US)

(72) Inventor: Jean Jacques Jaouen, Gloucester, VA (US)

( * ) Notice: Subject to any disclaimer, the term of this patent is extended or adjusted under 35 U.S.C. 154(b) by 288 days.

(21) Appl. No.: 14/517,895

(22) Filed: Oct. 19, 2014

(65) Prior Publication Data

US 2015/0043838 A1 Feb. 12, 2015

Related U.S. Application Data

(63) Continuation-in-part of application No. PCT/IB2012/000781, filed on Apr. 19, 2012.

(51) Int. Cl.

| | |
|---|---|
| *B65D 30/22* | (2006.01) |
| *A45D 34/00* | (2006.01) |
| *A45D 34/04* | (2006.01) |
| *B01F 11/00* | (2006.01) |
| *B01F 13/00* | (2006.01) |

(Continued)

(52) U.S. Cl.
CPC ............ *B65D 31/12* (2013.01); *A45D 34/00* (2013.01); *A45D 34/04* (2013.01); *B01F 11/0065* (2013.01); *B01F 13/0022* (2013.01); *B01F 15/029* (2013.01); *B01F 15/0212* (2013.01); *B65B 29/10* (2013.01); *B65D 33/2508* (2013.01); *B65D 35/22* (2013.01); *B65D 35/242* (2013.01); *B65D 47/185* (2013.01); *B65D 75/5811* (2013.01); *B65D 75/5866* (2013.01); *B65D 75/5883* (2013.01); *B65D 81/3266* (2013.01); *A45D 2200/058* (2013.01); *B65D 2575/586* (2013.01); *Y02W 30/807* (2015.05)

(58) Field of Classification Search
CPC .... B65D 31/12; B65D 33/2508; B65D 35/22; A45D 34/00; A45D 34/04; B01F 11/0065; B01F 13/0022; B01F 15/029; B65B 29/10
See application file for complete search history.

(56) References Cited

U.S. PATENT DOCUMENTS 3,065,898 A * 11/1962 Daugherty ............. B65D 35/02
222/95
3,211,342 A * 10/1965 De Wayne Miles ... B65D 35/18
222/107

(Continued)

*Primary Examiner* — Steven A. Reynolds
*Assistant Examiner* — James Way
(74) *Attorney, Agent, or Firm* — Miller Law Group, PLLC (57) ABSTRACT

A mixing pouch forms a packaging product that includes a first compartment containing a supply of a liquid ingredient and a second compartment that contains a supply of a powdered ingredient with a breakable seal between the two compartments to separate the two ingredients. Rupturing the breakable seal creates a common interior cavity and allows the mixing of the two ingredients to create a mixed product. One end of the mixing pouch is formed with a dispenser through which the mixed product is dispensed for use. An apparatus, such as a positionable clamp or an adhesive strip on the exterior of the mixing pouch, can reduce the size of the common interior cavity to facilitate the dispensing of the mixed product. Preferably, the mixing pouch is a flexible plastic member having a dispensing end formed with a channel closed by a tear-away portion.

4 Claims, 7 Drawing Sheets

(51) Int. Cl.
*B01F 15/02* (2006.01)
*B65D 75/58* (2006.01)
*B65D 33/25* (2006.01)
*B65D 35/22* (2006.01)
*B65D 81/32* (2006.01)
*B65D 47/18* (2006.01)
*B65B 29/10* (2006.01)
*B65D 35/24* (2006.01)

(56) References Cited

U.S. PATENT DOCUMENTS

| | | | | |
|---|---|---|---|---|
| 3,294,227 | A * | 12/1966 | Schneider | B65D 81/3266 206/219 |
| 3,608,709 | A * | 9/1971 | Pike | B29C 65/76 206/219 |
| 4,540,089 | A * | 9/1985 | Maloney | B31B 37/00 206/219 |
| 5,373,968 | A * | 12/1994 | Nelson | B65D 35/32 222/107 |
| 5,732,854 | A * | 3/1998 | Ruben | B65D 35/18 222/100 |
| 5,928,213 | A * | 7/1999 | Barney | A61J 1/10 206/219 |
| 6,415,479 | B1 * | 7/2002 | Steinberg | B65D 35/32 222/103 |
| 9,499,309 | B2 * | 11/2016 | Zerfas | B65D 75/44 |
| 2001/0040172 | A1 * | 11/2001 | Pirrallo | B65D 35/32 222/99 |
| 2005/0029294 | A1 * | 2/2005 | Jackson | B65D 35/18 222/95 |
| 2007/0114144 | A1 * | 5/2007 | Suzuki | B65D 81/3266 206/219 |
| 2008/0013869 | A1 * | 1/2008 | Forman | B65D 33/1691 383/210 |
| 2008/0029294 | A1 * | 2/2008 | Kawamura | H05K 3/381 174/261 |
| 2008/0240628 | A1 * | 10/2008 | VanLoocke | B31B 19/90 383/210 |
| 2013/0126370 | A1 | 5/2013 | Diliberto | |
| 2015/0041492 | A1 * | 2/2015 | Tunney | B65D 35/24 222/92 |

* cited by examiner

Fig. 6.4

MIXING POUCH WITH LIQUID AND POWDER COMPARTMENTS

CROSS-REFERENCE TO RELATED APPLICATIONS

This application is a continuation-in-part of International Patent Application No. PCT/IB2012/000781, filed Apr. 19, 2012, the content of which is incorporated herein by reference.

FIELD OF THE INVENTION

The present invention generally relates to product packaging and, more particularly, to a mixing pouch having compartments that contain liquid and powdered ingredients to be mixed and dispensed as a cosmetic product.

BACKGROUND OF THE INVENTION

In the cosmetic and other industries, liquid-based products often come in packaging as a complete, constituted product ready for use. Such product packaging is usually single-use and disposable, rather than being refillable or reusable. Packages often contain a quantity of the product which exceeds that required for a single usage, resulting in the remainder of the product drying out, spoiling, or otherwise going to waste.

Cosmetic products are commonly sold pre-constituted or hydrated, ready for use by the end user. However, these products require stabilizers and chemical preservatives that prevent spoilage. Otherwise, the products would have short shelf lives. It is desirable to provide packaging that does not require the use of such chemical additives. These additives detract from how natural the product is. It is desirable to provide a more natural product, so additives should be avoided when possible.

Many cosmetic facial treatments such as face masks can be very expensive for the end user. Further, they require a trip to the spa. Consumers desire a more affordable product they can use at home.

The above problems, and others, are reduced by the invention as herein described and shown.

SUMMARY OF THE INVENTION

It is an object of this invention to provide a mixing pouch that can be filled with a liquid in one compartment and a powder in a second compartment to be subsequently mixed to create a cosmetic product to be dispensed from the mixing pouch.

It is another object of this invention to provide a mixing pouch in which the two compartments holding a liquid and a powder respectively are separated by a breakable seal.

It is a feature of this invention that the ingredient in one compartment can be forced against the breakable seal to create sufficient force on the seal to rupture the seal and permit the ingredients of the two compartments to be mixed and create a desired cosmetic product.

It is still another object of this invention to provide a method of creating a mixing pouch having compartments holding a liquid and a powder, respectively, with a breakable seal separating the two compartments.

It is another feature of this invention that the rupture of the breakable seal creates a common interior cavity substantially equal to the combined size of the respective compartments.

It is still another feature of this invention that an apparatus is provided to reduce the size of the common interior cavity.

It is yet another feature of this invention that a clamp can be used to reduce the size of the common interior cavity.

It is an advantage of this invention that the clamp can be selectively positioned at a location as desired on the mixing pouch to reduce the size of the common interior cavity.

It is another advantage of this invention that the clamp can be mounted on a distal end of the mixing pouch and slid along the exterior surface of the mixing pouch to facilitate the dispensing of the mixed cosmetic product from the common interior cavity through a dispensing end of the mixing pouch.

It is still another advantage of this invention that the clamp can be used to create a breakable seal that separates a first compartment holding a liquid from a second compartment holding a powder.

It is still another feature of this invention that the apparatus for reducing the size of the common interior cavity can be formed as an adhesive strip placed on an exterior surface of the mixing pouch that will hold a rolled up distal portion of the mixing pouch to create a reduced size common interior cavity.

It is yet another advantage of this invention that the adhesive strip can be covered with a release member that protects the adhesive strip until the mixing pouch is ready to be used to dispense the mixed cosmetic product from the dispensing end of the mixing pouch.

It is an object of the present invention is to provide product packaging which serves both as packaging for a product and as a body for holding, dispensing, and applying the product.

It is another object of the present invention is to provide single-use or reusable product packaging for cosmetic or other products, especially those which benefit from binary or ingredient-segregated packaging.

It is still another object of the present invention is to provide compact packaging for certain products.

It is yet another object of the present invention is to provide a relocatable clamp which may serve to help separate the binary ingredients, thereby helping prevent exposure to one another prematurely.

It is still another object of the present invention is to provide a relocatable clamp which may serve to facilitate dispensing the product from the packaging once the binary components have been combined, thereby minimizing product waste and easing dispensation of the product.

It is a further object of the present invention is to alleviate problems of product waste and improve consumer convenience by providing single-use sized partitions of a product.

It is another object of the present invention is to provide a multiple-use product.

It is still another object of the present invention is to provide a cosmetic product in product packaging that does not require additives such as chemical preservatives.

It is still a further object of the present invention is to provide a cosmetic product which is inexpensive to produce and therefore inexpensive for the end user.

It is yet a further object of the present invention is to provide a "Do It Yourself (DIY) Mask."

It is yet another object of this invention to provide a method of manufacturing a mixing pouch that is formed with at least two compartments within which at least one compartment contains a liquid and at least one compartment contains a powder, where the compartments are separated by a breakable seal that can be selectively ruptured to permit a mixing of the liquid and powder ingredients to create a product for dispensing from the mixing pouch.

It is yet another object of this invention to provide a mixing pouch defining a first compartment containing a liquid ingredient and a second compartment containing a powdered ingredient with a selectively breakable seal between the compartments which is durable in construction, inexpensive of manufacture, carefree of maintenance, facile in assemblage, and simple and effective in use.

It is still another object of this invention to provide a method of manufacturing and using a mixing pouch having a first compartment containing a liquid ingredient and a second compartment containing a powdered ingredient with a selectively breakable seal between the compartments which can be broken to create a common interior cavity that permits the two ingredients to be mixed to create a mixed product for dispensing from the mixing pouch.

These and other objects, features and advantages are accomplished according to the instant invention by providing a mixing pouch forming a packaging product that includes a first compartment containing a supply of a liquid ingredient and a second compartment that contains a supply of a powdered ingredient with a breakable seal between the two compartments to separate the two ingredients. Rupturing the breakable seal creates a common interior cavity and allows the mixing of the two ingredients to create a mixed product. One end of the mixing pouch is formed with a dispenser through which the mixed product is dispensed for use. An apparatus, such as a positionable clamp or an adhesive strip on the exterior of the mixing pouch, can reduce the size of the common interior cavity to facilitate the dispensing of the mixed product. Preferably, the mixing pouch is a flexible plastic member having a dispensing end formed with a channel closed by a tear-away portion.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3.1 is an elevational view of a fourth embodiment of the instant invention showing an alternative configuration for a reusable mixing pouch having a removable end cap at the distal end of the mixing pouch and a dispenser tip at the proximal end of the mixing pouch;

FIGS. 3.1A and 3.1B are sectional views of alternative dispensing tips for use with the reusable mixing pouch depicted in FIG. 3.1;

FIG. 3.2 is a side elevational view of a first embodiment of the repositionable clamp;

FIG. 3.3 is an elevational view of another alternative embodiment of a reusable mixing pouch on which the positionable clamp can close the distal end of the mixing pouch and to slide along the reusable tube to facilitate the dispensing of the mixed product, a second positionable clamp can be located at an intermediate position to create the breakable seal between respective compartments;

FIG. 3.3A is an alternative dispensing tip for use with the reusable mixing pouch of at least FIG. 3.3;

FIGS. 3.3B, 3.3C and 3.3D are front, plan and side views of an alternative dispensing tip for use with the reusable mixing pouch of at least FIG. 3.3;

FIGS. 4.1A and 4.1B are elevational views of a second embodiment of the positionable clamp in respective opened and closed configurations;

FIGS. 4.2A, 4.2B and 4.2C are elevational and plan views of the first embodiment of the positionable clamp as depicted in FIG. 3.2, but depicting the clamp in opened and closed positions;

FIGS. 4.2D, 4.2E and 4.2F are end views of alternative cross-sectional configurations of the locking device for the positionable clamp shown in FIG. 4.2;

FIGS. 4.2G is an end view of the preferred cross-sectional configuration of the positionable clamp shown in FIG. 4.2;

FIG. 4.2H is an end view of the preferred cross-sectional configuration of the positionable clamp shown in FIG. 4.2G with the preferred configuration of the locking device shown in FIG. 4.2D;

FIGS. 4.3A and 4.3B are elevational views of a third embodiment of the positionable clamp in respective opened and closed configurations;

DETAILED DESCRIPTION OF THE PREFERRED EMBODIMENTS

In one embodiment, the present invention comprises multi-compartment packaging 100. A breakable divisor 106 separates the compartments 104, 107. In each of the compartments 104, 107 is one of a set of ingredients. When combined, the ingredients constitute a cosmetic product such as a face mask or skin treatment. For example, the invention may comprise a two-compartment packaging, each compartment containing one of a set of binary ingredients.

Along one edge of one of a first compartment 104 is a dispensing tip 102. The dispensing tip 102 has a center channel 103. At an interior end, the channel 103 terminates in the first compartment 104. At an exterior end, the channel 103 is occluded by a tear-away portion 101 of the dispensing tip 102. When the tear-away portion 101 is torn away, the channel 103 is open to allow communication of the fluid from the interior of the first compartment 104 with the exterior of the packaging 100.

The dispensing tip 102 may be constructed of a relatively stiff, but bendable, material. The dispensing tip 102 may be constructed of a reinforcing material. For example, the dispensing tip 102 may be constructed of a stiff yet thin plastic. The dispending tip 102 facilitates spreading the product on the treatment area.

Adjacent compartments 104, 107 are joined along a common edge 106. The edge 106 may comprise a breakable seal 106. Once the breakable seal 106 is broken, the ingredients contained in the two adjacent compartments 104, 107 can intermix. The edge of the first compartment 104 that comprises the dispensing tip 102 may be an edge adjacent to the common edge 106 or may be an end opposite the common edge 106.

Each of the ingredients may comprise a fluid or a powder. The fluid may be of any viscosity and may comprise water, a lotion, a cream, an herbal concoction, a solute, or any other liquid. Fluid means liquid, but may include liquids with one or more gasses or solids dissolved or otherwise contained therein.

Adjacent compartments 104, 107 may be separated by a breakable seal 106. The seal 106 may be effected by an adhesive placed internally of the mixing pouch 100, or may be effected solely by pressure existed by a clamp 105. In the case of an adhesive or other similar seal 106 separating the two compartments 104, 107, the seal 106 may be broken when a user exerts pressure on one of the compartments 104, 107, thereby stressing the seal to the point of breaking. In the case of a breakable adhesive seal 106 broken by pressure, other edges defining each of the compartments 104, 107 should have a higher resistance to pressure to prevent accidentally rupturing the incorrect edge. In the case of a clamp 105, the seal may be broken by removing the clamp 105. A clamp 105 and an adhesive or other seal 106 may be used in conjunction with one another. Once the seal is broken, the binary ingredients are free to intermix, thereby reconstituting the cosmetic product.

The clamp 105 may serve to separate the compartments 104, 107 to prevent intermixing of the ingredients. In this case, the clamp may be in addition to an adhesive seal 106 or in lieu of it. When removed, the clamp 105 no longer prevents the intermixing of the ingredients. Once all seals separating the compartments are removed, the interiors of the compartments 104, 107 merge to form a common interior cavity 110.

The clamp 105 may serve to assist in dispensing the product once the mixture is formed. Once the ingredients intermix and the cosmetic product is formed, the clamp 105 can be reattached to the product packaging at the end opposite the dispensing end 102. The clamp 105 can then be slid toward the dispensing end 102, reducing the portion of the common interior cavity 110 available to the cosmetic product and facilitating the dispensing of the cosmetic product from the aperture 103 of the dispensing tip 102.

The clamp 105 may serve multiple purposes. It may serve to separate the ingredients contained in adjacent compartments 104, 107 when in a first position. The clamp 105 may then be removed to allow the formation of the common interior cavity 110 and the mixing of the ingredients. The clamp 105 may then be repositioned to facilitate dispensing of the mixed product from the common interior cavity 110.

The clamp 105 may comprise two substantially parallel bars 115, 116 joined at one end by a hinge 117 and at an opposite end by a clasp 119. The parallel bars 115, 116 have a length greater than or equal to the portion of the packaging 100 which they are clamping. Additional variations of the clamp 105 are described in greater detail below.

The user may begin by removing the clamp 105 from the common edge. If the breakable seal 106 of the common edge is sealed by an adhesive in addition to the clamp 105, the user will grip one of both of the compartments 104, 107 of the mixing pouch 100 and exert a squeezing force. This squeezing force is translated to the breakable seal 106 and various other portions of the compartments 104, 107. If the other edges of the compartments are constructed with adhesive, these other edges should be stronger than the breakable seal 106 so that it is the breakable seal 106 which ruptures first when the user squeezes the compartment or compartments 104, 107. The common interior cavity 110 is now formed, as the mixing pouch 100 is no longer segregated into separate compartments 104, 107. The ingredients mix to create the cosmetic product. A shaking or massaging action may facilitate mixing of the ingredients to form the product. The user then repositions the clamp 105 at the edge of the mixing pouch 100 opposite the dispensing end 102 and tears away the tab 101 sealing the channel 103 of the dispensing end 102. The user can then exert squeezing force on the mixing pouch 100 to dispense the cosmetic product from the dispensing end 102. To facilitate dispensing of the cosmetic product, the user can slide the clamp 105 toward the dispensing end 102, thereby reducing the volume of the common interior cavity 110 available to the cosmetic product. Sliding the clamp 105 farther will force the dispensing of the cosmetic product through the aperture 103 of the dispensing end 102. The cosmetic product can thus be applied directly to the desired treatment surface. For example, a face mask may be applied directly to the face. However, if desired, the product may be applied to any other surface or instrument, such as a miniature spatula (not shown) to assist in application of the product to the target treatment surface.

The cosmetic product may be hydrated, meaning it is substantially free of moisture. A dehydrated powder may be rehydrated with water or with another fluid. Cosmetic powders of varying nature will have varying preparation methods. This other fluid may be contained in another of the compartments. For example, the fluid may be fruit juice, vegetable juice, herbal tea, lotion, balm, or other similar products. Variations in the viscosity of these fluids influence the viscosity of the product created, as does the composition and nature of the powder and the reaction between the powder and the fluid used.

Figures 1, 1A:
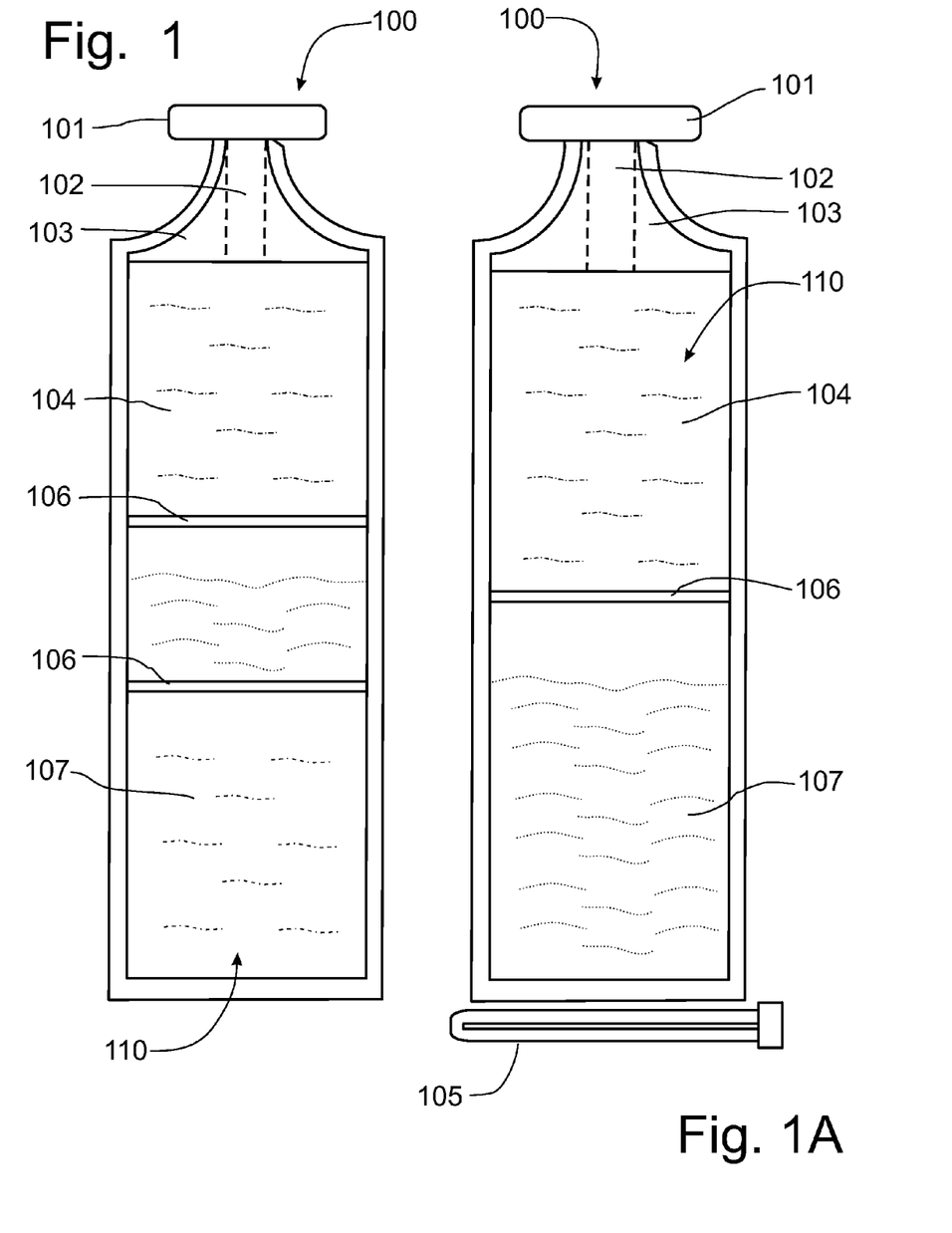
FIG. 1 is an elevational view of a first embodiment of a mixing pouch incorporating the principles of the instant invention and having three compartments containing respective ingredients separated by a breakable seal between adjacent compartments.
FIG. 1A is an elevational view of a second embodiment of a mixing pouch incorporating the principles of the instant invention but having only two compartments separated by a breakable seal with a selectively positionable clamp being depicted at the distal end of the mixing pouch.

A single use embodiment is depicted in FIGS. 1 and 1A. The interior of the mixing pouch 100 is comprised of a first compartment 104 and a second compartment 107. The first compartment 104 and the second compartment 107 are breakably joined at a common edge 106 which comprises a breakable seal 106. The clamp 105 can be removably secured along the common edge 106 and the breakable seal 106. Alternatively, the clamp 105 can be located at the distal edge of the second compartment 107 opposite of the common edge 106. The ingredients contained within the first compartment 104 and the second compartment 107 can be mixed together once the breakable seal 106 has been ruptured, whereupon the ingredients form a mixed product, such as a cosmetic product, that can be dispensed through the channel 103. The channel 103 continues through the center of the dispensing end 102 but terminates into the tear-away portion 101. When the tear-away portion 101 is removed, the channel 103 is exposed through an aperture 103 in the dispensing end 102 through which the mixed product can be dispensed for utilization as desired.

Figure 2:
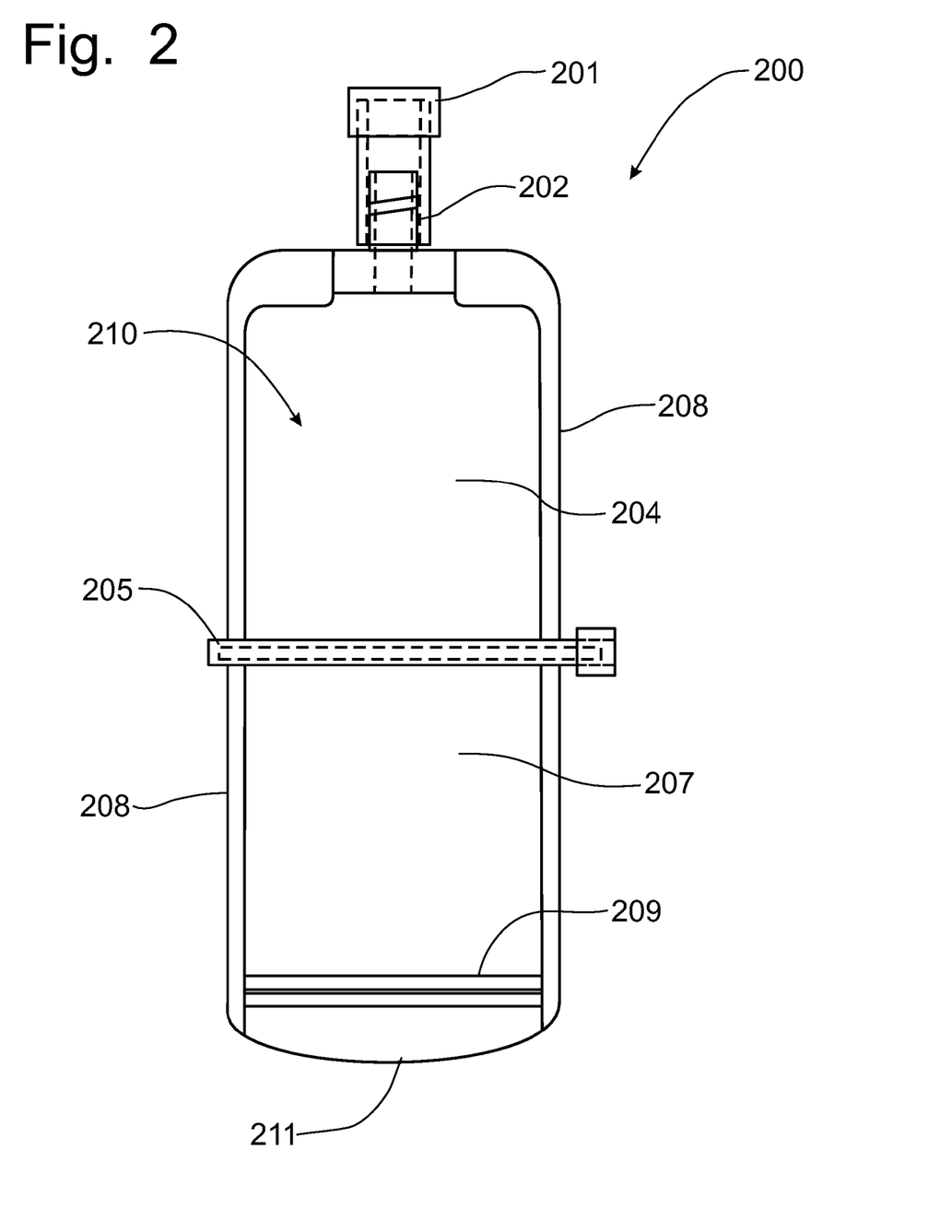
FIG. 2 is an elevational view of a third embodiment of the instant invention depicting a reusable mixing pouch with the selectively positionable clamp located at an intermediate position to define a breakable seal between two compartments, a reclosable seal being shown at the distal end of the mixing pouch to permit the introduction of an ingredient into the compartment below the positionable clamp.
Figure 3:
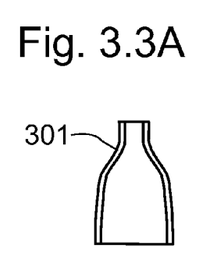
Figure 4:
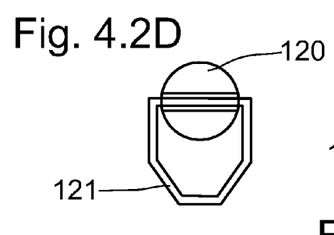

In another embodiment shown in FIG. 2, the packaging product is a reusable applicator 200 which initially contains the components needed to prepare the product for use. The applicator 200 comprises a flexible annular wall 208. Though this wall 208 is disposed toward being generally ring-shaped, it is flexible and so is deformable. However, rather than being generally ring-shaped, the flexible annular wall 208 may be oval or ellipsoid. The thickness and material composition of the wall 208 influence how pliant it is. However, the wall 208 is of a thickness and material composition such that it can tolerate being deformed by the clamp 205 to divide the mixing pouch 200 into at least two compartments 204, 207 in the event the user decides to load the respective ingredients into the compartments 204, 207 for mixing later. The clamp 205, or if necessary a second clamp 205, would also be operable to seal the distal open end 211 sufficiently to prevent the flow of any cosmetic products from the applicator's inner cavity 210. Preferably, however, the open end 211 of the mixing pouch 200 is formed with an openable seal 209 along the distal open end of the compartment 207. This openable seal 209 may be a plastic interlocking seal.

Figures 31, 32, 33:
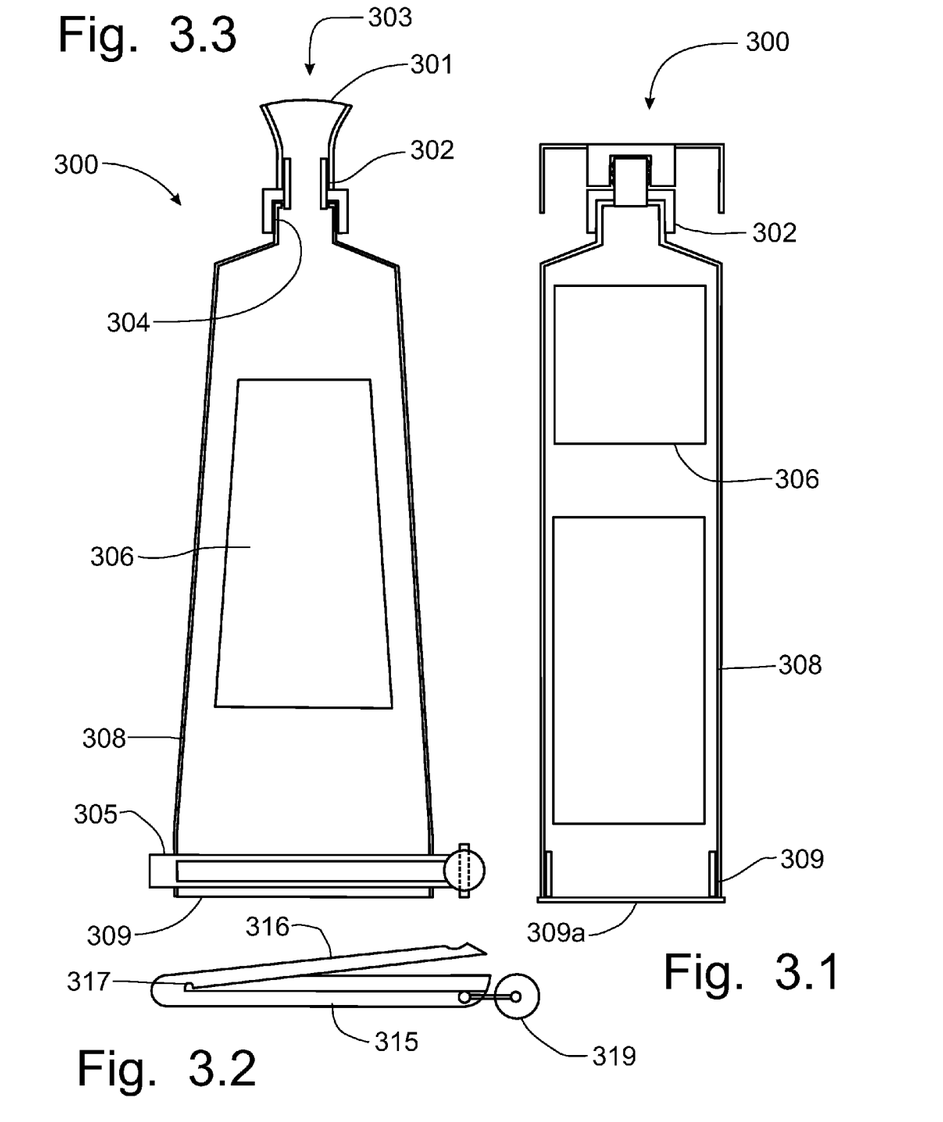

In an alternate embodiment shown in FIG. 3, a reusable packaging tube applicator 300 comprises a tapered discharge end 302 and an open access end 309 joined by a flexible annular wall 308. The tapered discharge end 302 includes a dispensing tip 301 having an aperture 303 and an external thread. The open access end 309 is provided with an end cap 309a that is removable to provide access to an inner cavity 310 of the flexible annular wall 308. A clamp 305 is preferably formed with parallel bars 315, 316 joined at a hinge 317. A sachet 306 containing a cosmetic ingredient and is placed within the inner cavity 310. A nozzle 304 has an internal thread that is compatible with the external thread of the tip 301.

This alternative embodiment may have several variations. The sachet 306, nozzle 304, and clamp 305 may be retained within the inner cavity 310 by the removable end cap 309a. The cosmetic ingredient may be combined with a liquid within the inner cavity 310 to form a cosmetic product. The nozzle 304 may attach to the tip 301. The clamp 305 may deform a portion of the annular wall 308 to obstruct the flow of the cosmetic product toward the access end 309 so that the cosmetic product may dispense from the inner cavity 310 via the nozzle 304. The sachet 306 may be one of a plurality of sachets. The nozzle 304 may be one of a plurality of nozzles, each respective nozzle 304, as depicted in FIGS. 3.1A, 3.1B, and 3.3A through 3.3D, being able to mate to the tip 301. The nozzle 304 may occlude the aperture 303 when attached to the tip 301, or may leave a focused aperture through which to dispense the product. The powder may comprise a dehydrated cosmetic product. The clamp 305 may provide lateral pressure to the annular wall 308, thereby deforming the annular wall 308 to substantially seal the access end 309.

Variations of the clamp 105 can be seen in FIGS. 4.1A through 4.3B. The configuration of the clamp 105, which is also reflected elsewhere herein as clamp 205, 305 and 505, is shown in FIGS. 4.2A through 4.2C. In each variation of the clamp 105, the clamp 105 is formed with two parallel bars 115, 116 that are connected by a hinge 117 such that the upper bar 116 is movable relative to the lower bar 115 about the hinge 117. The lower bar 115 supports the clasp 119 at the end thereof remote from the hinge 117 so that the clasp 119 can secure the upper bar 116 in an orientation parallel to the lower bar 115 with the mixing pouch trapped therebetween.

In the configuration of the clasp 119 in FIGS. 4.2A through 4.2C, the clasp 119 is a roller 120 that is mounted on a bale 121 pivotally supported on the end of the lower bar 115. A notch 122 formed on the top surface of the upper bar 116 provides some resistance for the movement of the roller 120 when the roller 120 locks the upper bar 116 in the clamped parallel position depicted in FIGS. 4.2B and 4.2C. In FIGS. 4.2D through 4.2H, the end views of the clasp 119 and of the clamp 105 can best be seen. In FIG. 4.2D, the roller 120 is shown as being in a round configuration mounted on the formed bale 121. In FIG. 4.2E, the bale 121 is circular and the round roller 120 is chamfered to accommodate the circular bale 121. In FIG. 4.2F, the roller 120 is mounted on a formed bale 121 and is in a cylindrical shape with the round side thereof oriented to engage the notch 122 on the top of the upper bar 116. The end view of one configuration of the lower and upper bars 115, 116 of the clamp 105 are depicted in FIG. 4.2G, while the end view of the clamp 105 is shown with the clasp 119 engaged with the top surface of the upper bar 116.

The clasp 119 in the configuration shown in FIGS. 4.1A and 4.1B is a tabbed prong 124 that deflects to lock the upper bar 116 in the clamped parallel position shown in FIG. 4.1B. Alternatively, the clasp 119 could be in the form of a detached nut 125 that threads onto the remote end of the lower bar 115 to trap the upper bar 116 in the clamped parallel position shown in FIG. 4.3B. The nut 125 can also be formed to snap into placed on the remote end of the lower bar 115, or to engage threading that is formed on remote ends of both the lower and upper bars 115, 116.

Figures 5, 5A:
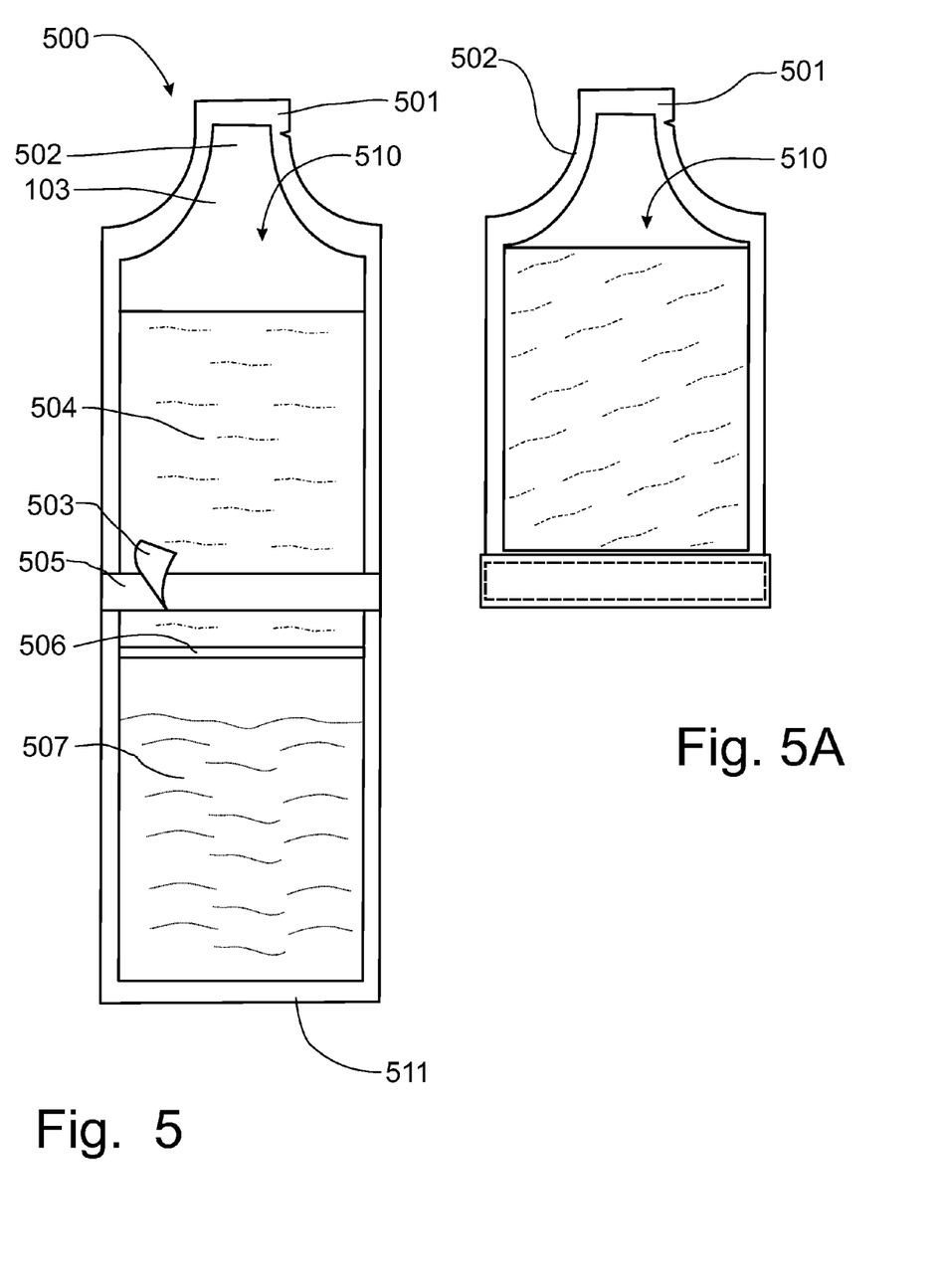
FIG. 5 is an elevational view of a fifth embodiment of the mixing pouch incorporating the principles of the instant invention formed with a preferred two compartment configuration having a breakable seal formed through adhesive on the interior of the mixing pouch and an adhesive strip covered by a removable release member on the exterior of the mixing pouch to serve as the apparatus for reducing the size of the common interior cavity internally of the mixing pouch.
FIG. 5A is an elevational view of the fifth embodiment of the mixing pouch shown in FIG. 5, but with the distal end of the mixing pouch rolled up and secured by the adhesive strip having the release member removed to facilitate the dispensing of the mixed product through the proximal dispensing end of the mixing pouch.

Referring now to FIGS. 5 and 5A, another alternative embodiment incorporating the principles of the instant invention can be best understood. The mixing pouch 500 is formed as a plastic envelope that is sealed around the peripheral edge through either a blow molding technique or by adhering the peripheral edges of two opposing sheets of plastic material with adhesive to seal the envelope and create a pouch 500 that has an internal cavity 510 terminating at a dispenser tip 502 closed by a tear-away portion 501. The internal cavity 510 is divided into two discrete compartments 504, 507 by a breakable seal 506, preferably formed through an application of an adhesive to the interior surfaces of the mixing pouch 500 to create a divisor 506 between the two compartments 504, 507. On an exterior surface of the mixing pouch 500, an adhesive strip 505 covered by a removable release member 503 is formed to permit a shortening of the internal cavity 510 for dispensing of the mixed product, as will be described in greater detail below.

Figure 6:
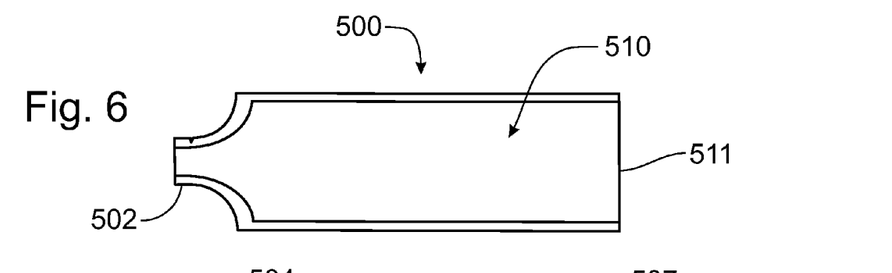
FIGS. 6 through 6.4 are schematic plan views, except for FIG. 6.2A which is an end view of the mixing pouch shown in FIG. 6.2, depicting the formation of the mixing pouch as shown in FIG. 5 having two compartments separated by a breakable adhesive seal and containing, respectively, a liquid ingredient and a powdered ingredient.

The formation of the mixing pouch 500 is schematically depicted in FIGS. 6-6.4. The formed mixing pouch 500 having sealed side peripheral edges, leaving the proximal top edge of the tear-away portion 501 and the distal end edge 511 of the internal cavity 510 open. Although the side peripheral edges can be sealed through an application of an adhesive, the preferable formation of the side peripheral sealed edges is through an application of heat through a heat seal die. Preferably, the inner surfaces of the plastic sheets forming the pouch have an adhesion promoting coating applied to the surface. The breakable seal 506 is preferably formed through an application of less heat than is used on the side peripheral edges, which results is a stronger seal on the side peripheral edges than along the breakable seal. Accordingly, the breakable seal will burst with an application of pressure before the side peripheral edges will rupture.

The adhesive strip 505 on the exterior surface of the mixing pouch 500 is formed through an application of an adhesive which is then covered and protected through an applied removable release strip 503 placed over the adhesive strip 505. The mixing pouch 500 is then bent at the location of the breakable seal 506 to reinforce the formation of the breakable seal 506, but also to elevate the distal and proximal ends of the mixing pouch 500 as represented in FIG. 6.2A.

Figures 6, 61, 62, 63, 64:
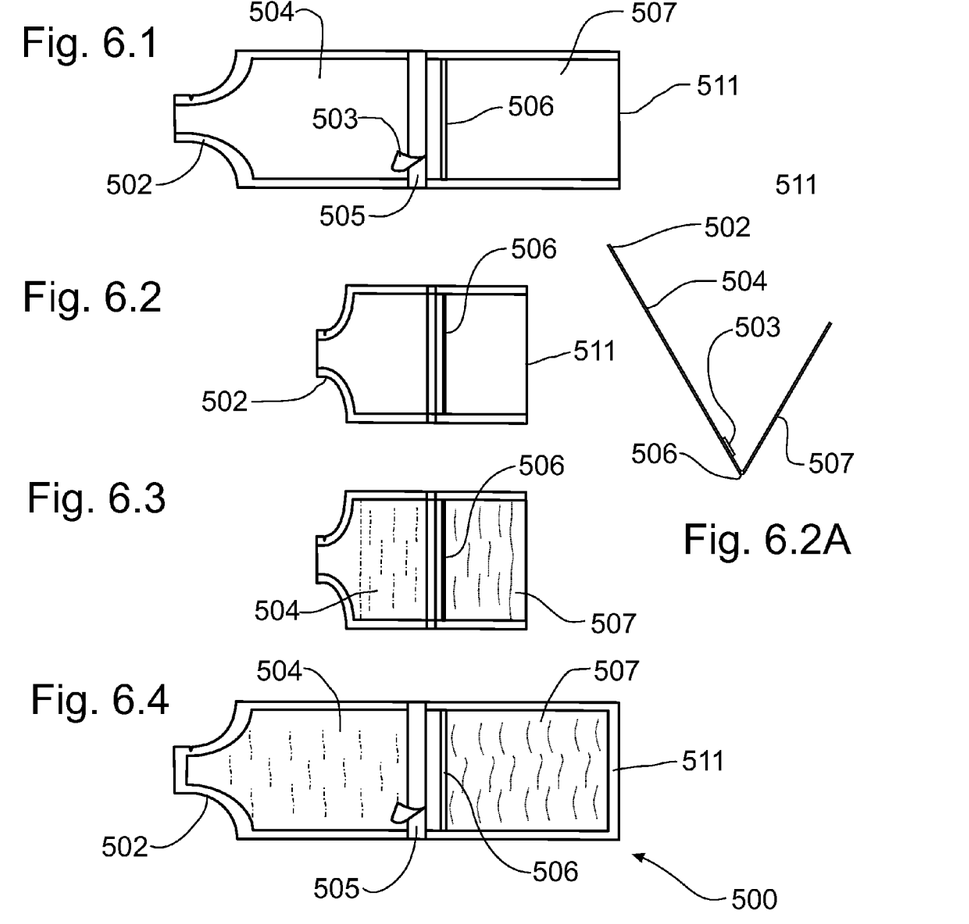

With the distal and proximal ends elevated appropriately, the introduction, as represented in FIG. 6.3, of a liquid ingredient into one compartment, such as the first compartment 504, and of a powdered ingredient into the other compartment, such as the second compartment 507, can be facilitated. Once the compartments 504 and 507 have been filled with the desired quantities of the liquid ingredient and the powdered ingredient, the distal and proximal ends 501, 511 can be sealed and the mixing pouch 500 is ready for use.

Alternatively, a mixing pouch such as is depicted in FIG. 1 and having more than two discrete compartments for retaining respective supplies of liquid and powdered ingredients can be created in a similar manner by forming the interior breakable seals and the peripheral edges of the body through the application of adhesives and securing opposing surfaces together, except for a common side edge of the respective compartments which are left with an opening into each respective compartment. The corresponding ingredients can be introduced into the respective compartments simultaneously or sequentially and then the openings sealed to create separate compartment separated by the breakable seals.

Utilization of the mixing pouch 500 is similar to the other embodiments described above. The user asserts a pressure force on the breakable seal 506 by squeezing, preferably, the powdered ingredient in the second compartment, until the seal 506 breaks and allows the mixing of the liquid and powdered ingredients. Massaging and/or shaking the mixing pouch 500, as needed, will properly mix the two individual components to create a mixed product that is ready for dispensing. As is depicted in FIG. 5A, the distal end 511 of the common interior cavity 510 is rolled toward the dispenser end 502 until the rolled-up portion of the mixing pouch 500 can be pressed against the adhesive strip 505 having the release member 503 removed therefrom. With this orientation of the mixing pouch 500, the mixed product is moved into the first compartment 504 and can be dispensed after the tear-away portion 501 is removed from the dispenser tip 502 to open the channel allowing the dispensing of the mixed product in a manner desired by the user. Once the mixed product has been completely dispensed, the mixing pouch 500 can be discarded.

One skilled in the art will recognize that the placement of a liquid ingredient in a first compartment and a dry powdered ingredient in a second compartment of a single common interior cavity of a mixing pouch is a difficult task that is not known in the prior art. Both the liquid and powdered ingredients must remain uncontaminated by the other, and in some scenarios also remain sterile, to maintain the integrity of the ultimate mixing process. Accordingly, the provision of a single mixing pouch having at least two individual compartments separated by a breakable seal divisor to allow a subsequent mixing of the respective ingredients is heretofore unknown in the art. The concept of a two or more compartment mixing pouch having separated liquid and powdered ingredients that can be mixed subsequently to the formation of the mixing pouch is particularly adaptable to the cosmetic industry to provide do-it-yourself face masks, skin treatments, and other cosmetic products. However, the cosmetic industry is not the only industry in which this mixing bag concept can be utilized.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. Other systems, methods, and/or products according to the above embodiment will be or will become apparent to one of ordinary skill in the art upon review of the above description, the following drawings, and any further description. It is intended that all such addition systems, methods, and/or products be included within this description, be within the scope of the present invention, and be protected by the accompanying claims.

Having thus described the invention, what is claimed is:

1. A product packaging for a cosmetic product, comprising:

a body with a common interior cavity formed by side edges and being divided into a first compartment and a second compartment separated by a breakable seal and being located on opposite sides of said breakable seal, one of said compartments containing a liquid ingredient and a second of said compartments containing a powdered ingredient with both said liquid and powder ingredients being simultaneously introduced into said first and second compartments, respectively;

said breakable seal being formed to have less strength than said side edges along an entire length dimension of said breakable seal extending between said side edges to provide a breakable seal configuration that permits said breakable seal to be selectively opened along said length dimension, said breakable seal being subject to rupturing along said length dimension by pressure generated through compressing said compartment containing said liquid ingredient to destroy the integrity of said first and second compartments and create said common interior cavity that allows the mixing of said liquid and powdered ingredients to create a mixed product; and a dispensing end formed at a proximal end of said common interior cavity for selectively dispensing said mixed product from said first compartment; and an adhesive strip supported on an exterior surface thereof, said adhesive strip being oriented transversely across the compartment located longitudinally above said breakable seal and being located longitudinally between said breakable seal and said dispensing end, said adhesive strip being covered by a selectively removable release member, said adhesive strip, when uncovered, securing a rolled-up portion of said body corresponding to the compartment located longitudinally below said breakable seal after the formation of said mixed product to reduce the volume of said common interior cavity to facilitate the dispensing of said mixed product from said dispensing end.

2. A mixing pouch for transporting and subsequently creating a mixed product, comprising:

a body with a common interior cavity formed by side edges and being divided into a first compartment and a second compartment separated by a breakable seal and being located on opposite sides of said breakable seal, one of said compartments containing a liquid ingredient and a second of said compartments containing a powdered ingredient with both said liquid and powder ingredients being simultaneously introduced into said first and second compartments, respectively;

said breakable seal being formed to have less strength than said side edges along an entire length dimension of said breakable seal extending between said side edges to provide a breakable seal configuration that permits said breakable seal to be selectively opened along said length dimension, said breakable seal being subject to rupturing along said length dimension by pressure generated through compressing said compartment containing said liquid ingredient to destroy the integrity of said first and second compartments and create said common interior cavity that allows the mixing of said liquid and powdered ingredients to create said mixed product;

a dispensing end formed at a proximal end of said common interior cavity for selectively dispensing said mixed product from said first compartment; and an apparatus for reducing the volume of said common interior cavity after the creation of said mixed product to facilitate the dispensing of said mixed product through said dispensing end, said apparatus being disposed transversely across the compartment located longitudinally above said breakable seal and being located longitudinally between said breakable seal and said dispensing end, said apparatus securing a rolled-up portion of said body corresponding to the compartment located longitudinally below said breakable seal after the formation of said mixed product to reduce the volume of said common interior cavity to facilitate the dispensing of said mixed product from said dispensing end.

3. The mixing pouch of claim 2 wherein seals are formed along peripheral edges of the first and second compartments and along said breakable seal through an application of a heat seal die where the peripheral edges are sealed at a higher temperature than the breakable seal so that the breakable seal is less strong than the seals along the peripheral edges.

4. The mixing pouch of claim 3 wherein said apparatus for reducing the volume of said common interior cavity comprises an adhesive strip formed on an exterior surface of said body, said adhesive strip being covered by a selectively removable release member, said adhesive strip, when uncovered, being operable to secure a rolled-up portion of said body after the formation of said mixed product to reduce the volume of said common interior cavity to facilitate the dispensing of said mixed product from said dispensing end.

* * * * *